No. 736,129. PATENTED AUG. 11, 1903.
F. MITCHELL.
VARIABLE GEARING FOR BICYCLES OR THE LIKE.
APPLICATION FILED AUG. 2, 1902.
NO MODEL. 3 SHEETS—SHEET 1.
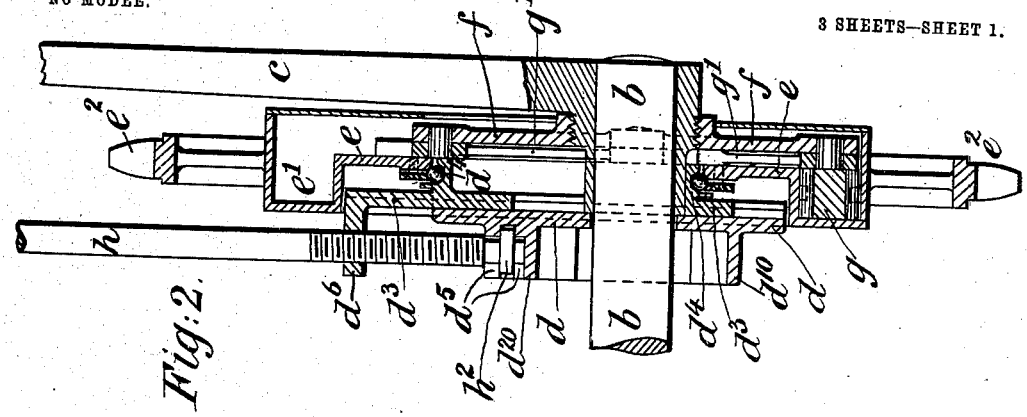
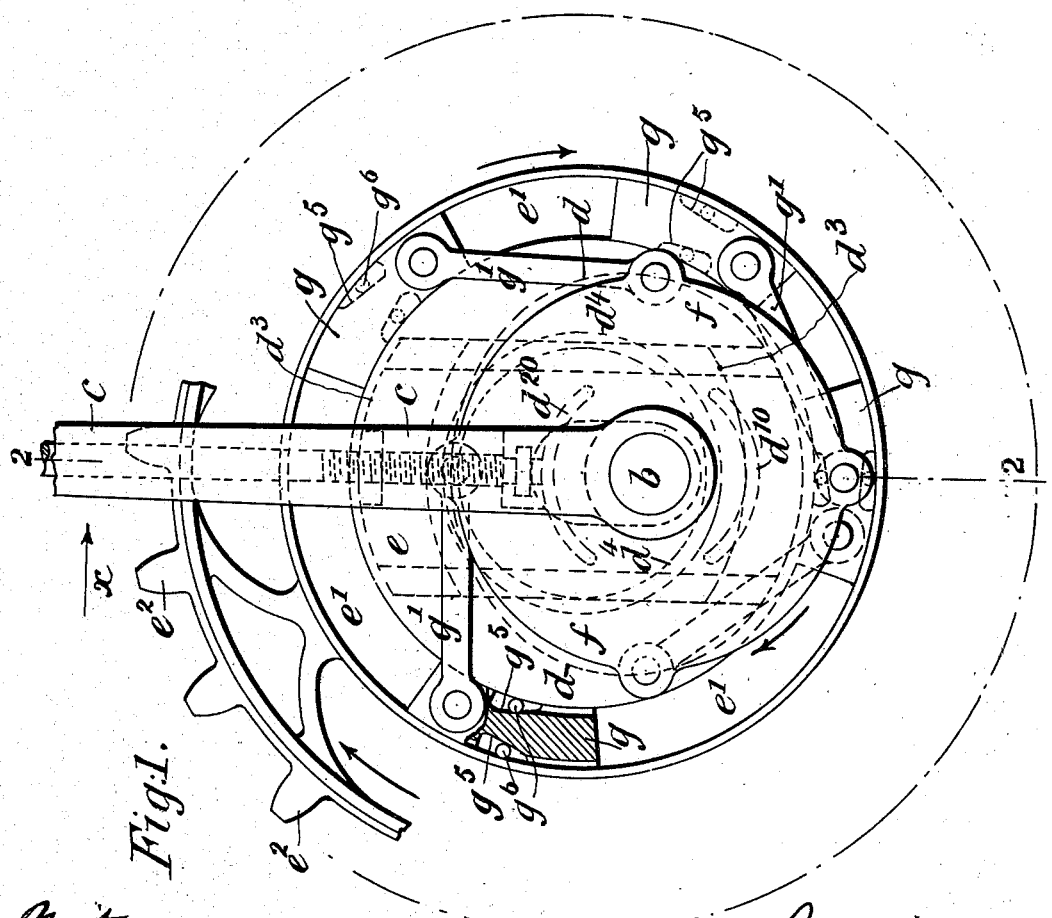

No. 736,129. PATENTED AUG. 11, 1903.
F. MITCHELL.
VARIABLE GEARING FOR BICYCLES OR THE LIKE.
APPLICATION FILED AUG. 2, 1902.
NO MODEL.
3 SHEETS—SHEET 2.
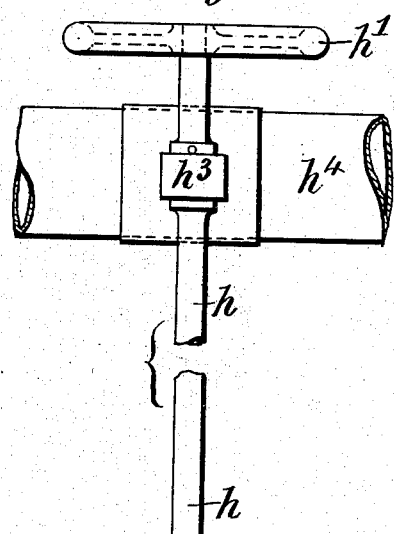
Fig. 3.
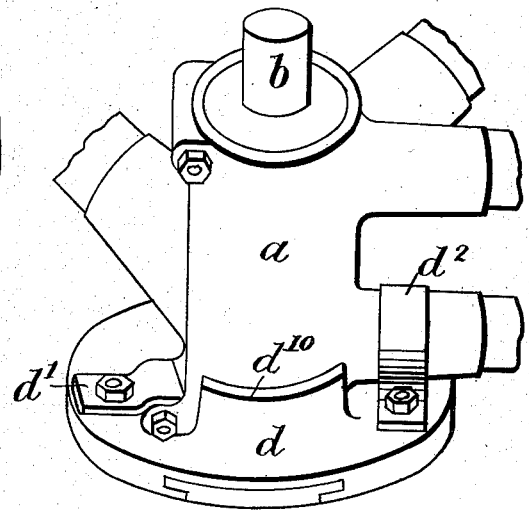
Fig. 4.
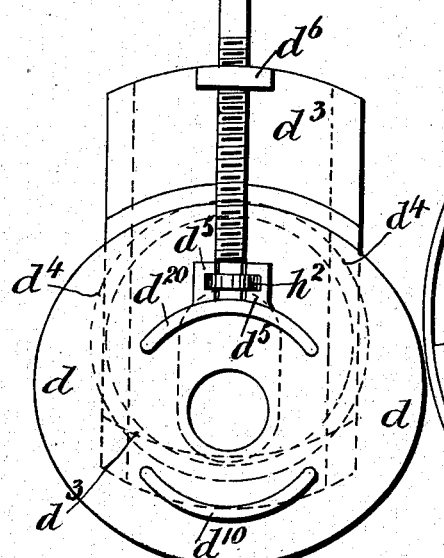
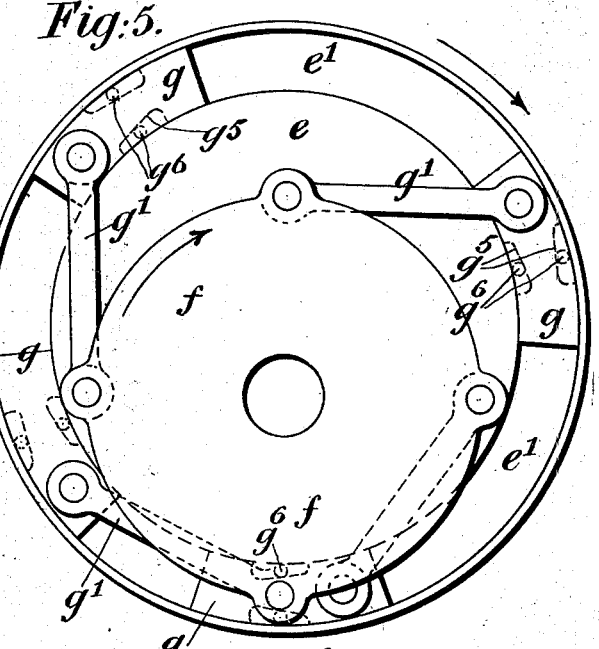
Fig. 5.

No. 736,129. PATENTED AUG. 11, 1903.
F. MITCHELL.
VARIABLE GEARING FOR BICYCLES OR THE LIKE.
APPLICATION FILED AUG. 2, 1902.
NO MODEL. 3 SHEETS—SHEET 3.
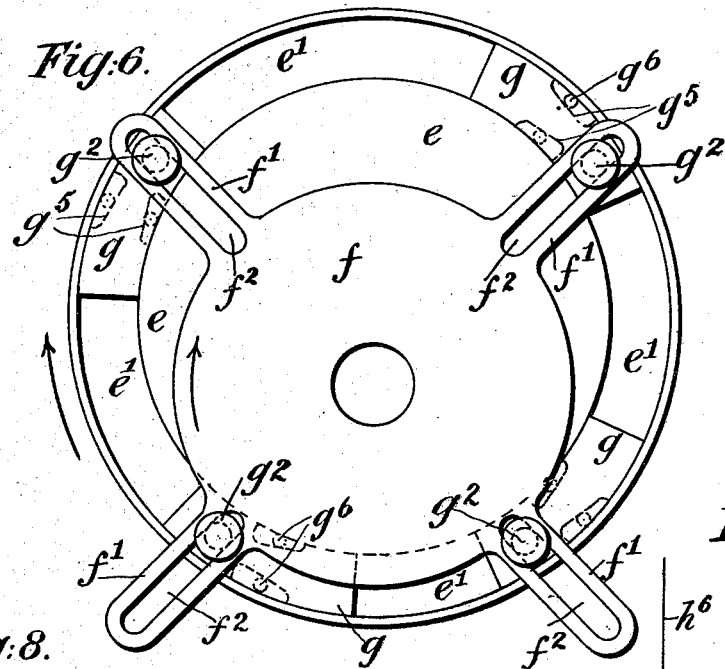
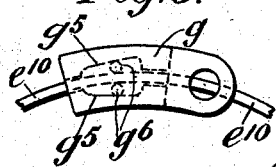
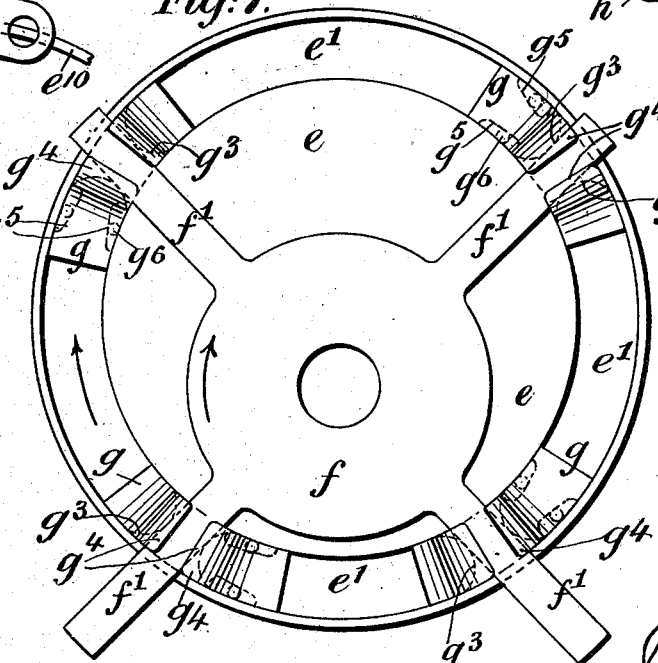
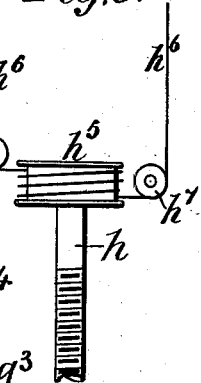

No. 736,129.

Patented August 11, 1903.

UNITED STATES PATENT OFFICE.

FRANK MITCHELL, OF LONDON, ENGLAND.

VARIABLE GEARING FOR BICYCLES OR THE LIKE.

SPECIFICATION forming part of Letters Patent No. 736,129, dated August 11, 1903.

Application filed August 2, 1902. Serial No. 118,089. (No model.)

*To all whom it may concern:*

Be it known that I, FRANK MITCHELL, a subject of the King of Great Britain, residing at London, England, have invented certain new and useful Variable Gearing for Bicycles or the Like, of which the following is a full, clear, and exact description.

My invention relates to an improved means by which the gearing or the relation between the speed of the pedals or driving power and that of the cycle or other vehicle may be varied by the rider while the machine is in motion, so as to enable him to more easily contend with the varying resistances experienced while riding.

I will describe my invention by the aid of the accompanying drawings, in which—

Figure 1 is a face view of the gearing applied to an ordinary safety-bicycle, showing one of the clutches in section. Fig. 2 is a section on the line 2.2 of Fig. 1 looking in the direction of the arrow $x$. Fig. 3 is a view of part of the apparatus, showing how certain parts may be moved in relation to one another whereby the gearing is altered. Fig. 4 is a perspective view showing how the gearing is attached to the bottom bracket of a bicycle. Figs. 5, 6, and 7 are views showing modifications in the method of connecting the driving and the driven parts. Fig. 8 shows a modified form of one of the clutches. Fig. 9 shows a modified form of apparatus for rotating the screw shown in Fig. 3 and thereby altering the gear ratio.

The bottom bracket $a$ and the crank-spindle $b$ may be of any ordinary construction.

The spindle $b$ is driven by cranks $c$, (only one of which is shown,) which latter are connected to the spindle $b$ in any well-known manner. The crank which is not shown has no connection with the gearing herein described, and throughout the remainder of the specification I shall only refer to that crank which is shown.

To the bottom bracket $a$ is rigidly connected a plate $d$ by means of the clips $d'$ $d^2$ and curved guides $d^{10}$ and $d^{20}$. The fixed plate $d$ is provided with a sliding portion $d^3$, working in suitable guides in said plate $d$. The sliding portion $d^3$ is provided with a ball-bearing $d^4$, upon which runs the clutch-plate $e$, provided with a groove $e'$ for the driving-clutches, to be hereinafter described. The chain-teeth $e^2$ are carried by the clutch-plate $e$ around the outside of the groove $e'$. It will thus be understood that the sliding portion $d^3$, the clutch-plate $e$, and the parts carried by this latter may be moved in relation to the fixed plate $d$ and spindle $b$.

To the crank $c$ is fixed a disk $f$, which consequently rotates at the same speed therewith. It is obvious that a number of separate arms may be employed instead of a disk. This disk $f$ or other rotating part or parts is or are connected in any suitable manner to a number of clutches $g$, which drive the clutch-plate $e$ with its groove $e'$ and chain-teeth $e^2$.

In Figs. 1, 2, 5, 6, and 7 the clutches $g$ are shown working in the groove $e'$. In Figs. 1 and 2 the disk $f$ is connected to the clutches $g$ by pivoted rods $g'$, which act in tension, the parts rotating in the direction shown by the arrows. In Fig. 5 the disk $f$ is connected to the clutches $g$ by pivoted rods $g'$, which act in compression. In Figs. 6 and 7 the disk $f$ is provided with rods or levers $f'$. In Fig. 6 the rods or levers $f'$ have slots $f^2$ working over pins $g^2$, attached to the clutches $g$. In Fig. 7 the rods or levers $f'$ slide between noses $g^3$, forming part of the clutches $g$, and are held between said noses $g^3$ by means of lugs $g^4$, carried by the clutches $g$. In all these forms as the disk $f$ is rotated by the crank $c$ the clutches $g$ are likewise rotated and drive the clutch-plate $e$ and chain-teeth $e^2$.

It will be understood that when the clutch-plate $e$ and disk $f$ are concentric all the clutches $g$ come into action and the chain-teeth $e^2$ are driven at the same speed as the crank $c$. When, however, the clutch-plate $e$ is eccentric to the disk $f$, as shown in the drawings, those clutches which are at a greater distance from the center of the spindle $b$ are moving more rapidly than those clutches which are nearer the spindle $b$, the result being that one or more of the clutches farther from the spindle $b$ are in action and driving the clutch-plate $e$ and those clutches which are nearer to the spindle are slipping or doing no work, and according to the amount of eccentricity between the disk $f$ and clutch-plate $e$ the speed between these two parts will vary.

In Fig. 3 I have shown one method of regulating the relation of the plate $d$ and the slide $d^3$. The screwed rod $h$ is provided at its upper end with a hand-wheel $h'$ and at its lower end with a disk $h^2$, working between a pair of jaws $d^5$, forming part of the fixed plate $d$. The rod $h$ is guided at its upper part by a socket $h^3$, carried by the top tube $h^4$ of the machine. The screwed portion of the rod $h$ works through a screw-threaded collar $d^6$, forming part of the slide $d^3$, and as the rod $h$ is rotated by its hand-wheel $h'$ so the slide $d^3$ is raised or lowered, and consequently the clutch-plate $e$ and disk $f$ are placed more or less eccentric with each other.

It is obvious that other methods of rotating the rod $h$ may be employed. In Fig. 9 the screwed rod $h$ is provided at its upper end with a flanged drum $h^5$, around which passes a cord or chain $h^6$, guided by pulleys $h^7$. The ends of the chain or cord $h^6$ may pass up to the handle-bar and be operated by any suitable form of mechanism, as will be well understood.

The clutches shown are each formed with two oppositely-inclined surfaces $g^5$, between which and the driven surface rollers or balls $g^6$ are inserted. In Figs. 1, 2, 5, 6, and 7 the oppositely-inclined surfaces $g^5$ are on the exterior of the clutches and the rollers or balls $g^6$ are forced outward against the walls of the groove $e'$; but in Fig. 8 the oppositely-inclined surfaces $g^5$ are shown facing one another and forcing the rollers or balls $g^6$ against a central flange or ring $e^{10}$. Such a form of clutch is found to give very good results, as there is so little surface in contact between the clutches and the driven part. At the same time the grip is very powerful and acts immediately—that is to say, there is no backlash between the parts.

In a machine provided with the gearing herein described it is not necessary to provide the rear chain-wheel with a free wheel-clutch, as the clutch-plate $e$ and its chain-teeth will overrun the clutches $g$ when the cranks $c$ are held stationary.

What I claim as my invention, and desire to secure by Letters Patent, is—

1. In variable gearing for bicycles and the like, the combination of a crank-bracket, a spindle, cranks carried by the spindle, a part rotating with the cranks and spindle, a fixed plate carried by the crank-bracket, a bearing movably mounted with relation to the fixed plate, means for operating said movably-mounted bearing, a clutch-plate rotating on said movably-mounted bearing, a clutch-path on said clutch-plate, separate blocks working in connection with said clutch-path, oppositely-arranged inclines in said blocks, balls acting between the inclines and clutch-path, and rods connected at one end to the friction-clutches and at the other end to the rotating part, substantially as set forth.

2. In variable gearing for bicycles and the like, the combination of a fixed bearing, a spindle rotating in said bearing, cranks carried by the spindle, a part rotating with the cranks and spindle, a fixed plate carried by the frame of the machine, a slide moving in said fixed plate, means for actuating the slide, a bearing carried by said slide, a clutch-plate rotating on said bearing, separate blocks working in connection with said clutch-plate, oppositely-arranged inclines in said blocks, balls acting between the inclines and the clutch-plate, and means for connecting the separate clutches with said rotating part, substantially as set forth.

3. In variable gearing for bicycles and the like, the combination of a spindle, cranks carried by the spindle, a part rotating with the cranks and spindle, a fixed plate carried by the frame of the machine, a slide moving in said fixed plate, a screw for actuating said slide, a bearing carried by said slide, a clutch-plate rotating on said bearing, separate blocks working in connection with said clutch-plate, oppositely-arranged inclines in said blocks, balls acting between the inclines and the clutch-plate, and rods for connecting the clutches with said rotating part, substantially as set forth.

4. In variable gearing for bicycles and the like, the combination of a spindle, means for driving the spindle, a part rotating with the spindle, a fixed plate carried by the frame of the machine, a slide moving in said fixed plate, means for actuating the slide, a bearing carried by said slide, a clutch-plate rotating on said bearing, a clutch-path on said clutch-plate, separate segment-shaped blocks working in connection with said clutch-path, oppositely-arranged inclines in the inner and outer curved faces of said blocks, balls acting between the inclines and clutch-path, and rods connected at one end to the segmental friction-clutches and at the other end to the rotating part, substantially as set forth.

5. In variable gearing for bicycles and the like, the combination of a fixed bearing, a spindle rotating in said bearing, means for driving the spindle, a part rotating with the spindle, a fixed plate carried by the frame of the machine, a slide moving in said fixed plate, means for actuating the slide, a bearing carried by said slide, a clutch-plate rotating on said bearing, separate segmental blocks working in connection with said clutch-plate, oppositely-arranged inclines in said blocks, balls acting between the inclines and the clutch-plate, and means for connecting the separate clutches with said rotating part, substantially as set forth.

6. In variable gearing for bicycles and the like, the combination of a fixed plate, a slide moving in said fixed plate, a bearing carried by the slide, means for moving said slide, a clutch-plate rotating on said bearing, chain-teeth carried by said clutch-plate, a clutch-path on said clutch-plate, segmental blocks working in connection with said clutch-path, oppositely-inclined surfaces in the curved faces of said blocks, balls acting between the inclined surfaces and the clutch-path, and means for connecting the clutches with a part rotated by the cranks, substantially as set forth.

In testimony whereof I affix my signature in presence of two witnesses.

F. MITCHELL.

Witnesses:
B. J. B. MILLS,
CLAUDE K. MILLS.